United States Patent [19]
Angermüller et al.

[11] Patent Number: 6,100,869
[45] Date of Patent: *Aug. 8, 2000

[54] DISPLAY SCREEN DEVICE

[75] Inventors: Helmut Angermüller, Oberursel; Josef Heimann, Düsseldorf, both of Germany

[73] Assignees: Mannesmann VDO AG, Frankfurt; Mannesmann AG, Düsseldorf, both of Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/630,429

[22] Filed: Apr. 3, 1996

[30] Foreign Application Priority Data

Apr. 3, 1995 [DE] Germany .................. 195 12 079

[51] Int. Cl.[7] ........................... G09G 3/36
[52] U.S. Cl. ........................ 345/102; 349/62
[58] Field of Search ............... 345/3, 102, 92, 345/32, 5, 31, 1, 113, 87; 349/65, 68, 62, 61; 359/707; 362/62, 63; 361/681; 353/74; 368/227, 242

[56] References Cited

U.S. PATENT DOCUMENTS

| | | | |
|---|---|---|---|
| 1,219,731 | 3/1917 | Hall | 345/32 |
| 2,261,571 | 11/1941 | Smith | 345/32 |
| 3,573,814 | 4/1971 | Lang | 345/32 |
| 3,957,351 | 5/1976 | Stockwell | 349/62 |
| 3,994,564 | 11/1976 | Somagyi | 349/65 |
| 4,043,636 | 8/1977 | Eberhardt et al. | 359/707 |
| 4,487,481 | 12/1984 | Suzawa | 345/102 |
| 4,760,389 | 7/1988 | Aoki et al. | 345/92 |
| 4,791,745 | 12/1988 | Pohn . | |
| 4,945,350 | 7/1990 | Kawamura | 345/102 |
| 5,075,824 | 12/1991 | Tan . | |
| 5,130,907 | 7/1992 | Tortola et al. | 345/102 |
| 5,247,429 | 9/1993 | Iwase et al. | 362/29 |
| 5,406,268 | 4/1995 | Fullmer | 345/113 |
| 5,574,477 | 11/1996 | Shimizu et al. | 345/102 |
| 5,580,146 | 12/1996 | Maslow | 353/74 |
| 5,583,529 | 12/1996 | Satou | 345/87 |
| 5,745,340 | 4/1998 | Landau | 361/681 |

FOREIGN PATENT DOCUMENTS

| | | |
|---|---|---|
| 1409010 | 12/1965 | France . |
| 2235631 | 1/1975 | France . |
| 2136340 | 2/1972 | Germany . |
| 2902745 | 8/1980 | Germany . |
| 3511839 | 10/1986 | Germany . |
| 8711933 | 12/1987 | Germany . |

*Primary Examiner*—Jeffery Brier
*Attorney, Agent, or Firm*—Martin A. Farber

[57] ABSTRACT

In an illuminating system for a display screen device, there is at least one lamp located in an accessory unit (2). This lamp (3) is connected via a light guide (4) with a display field (6) of the display screen device (1). This arrangement serves for illumination of the display field (6) by transmitted light. In order that the display screen device (1) can be removed without the lamp (3), the light guides (4) at the transition between accessory unit (2) and display screen device (1) are interrupted and have a light output surface (7) of the accessory unit and a light input surface (8) of the screen device.

26 Claims, 1 Drawing Sheet

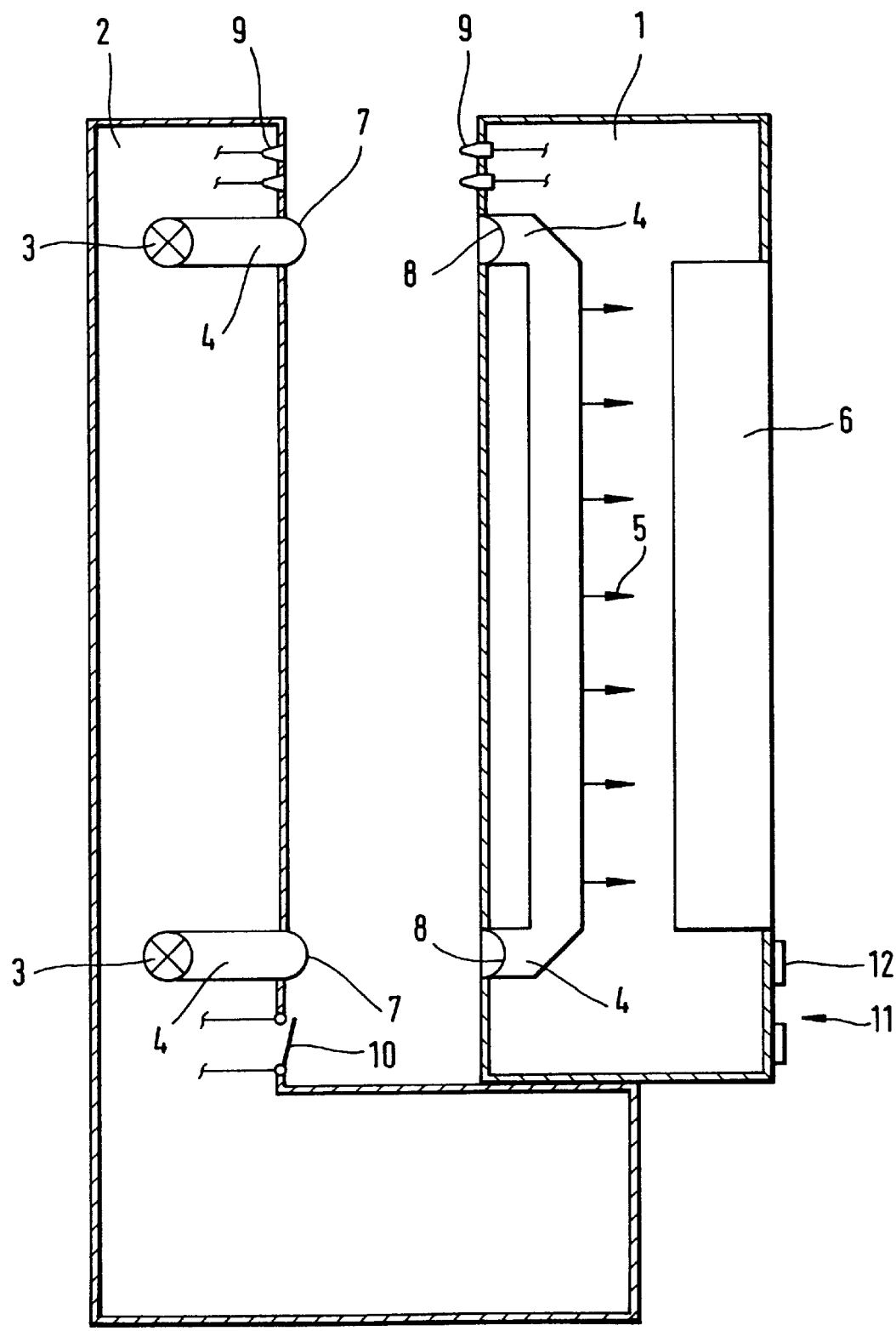

DISPLAY SCREEN DEVICE

FIELD AND BACKGROUND OF THE INVENTION

The present invention relates to a display screen device having a display field which can be illuminated by at least one lamp.

Such display screen devices are generally known and are frequently used as notebooks, clocks or handys. The lamp is integrated in the display screen device and connected to the current supply which is in any event present. In this connection, the lamp is either located behind the display field and illuminates it, or it is arranged under a cowling on the edge of the display field and illuminates the field from the side. In order to keep the dimensions of the display screen device within limits, it is endeavored in both cases to arrange the lamp as close as possible to the display field. However, this has the result that, due to the heat given off by the lamp, the display field as well as the display screen device are heated. There is also the disadvantage that the lamp increases the weight and size and, in the event of a portable display screen device, must be taken along by the user even he does not need it.

Since the weight and the size of the display screen device must not exceed a given reasonable amount, the current supply, developed as battery, can be of only limited size. This, in its turn, also leads to a limiting of the possible luminous density which the lamp can produce.

Such display screen devices are subject, as portable units, also to considerable blows, which frequently lead to an early failure in the lamps.

If it is desired to reduce the heating of the display screen device which is effected by a lamp, one can also provide a lamp of the reading-lamp type for illuminating the display field from above. However, this also increases the weight and the volume of the display screen device and leads to undesired reflections.

SUMMARY OF THE INVENTION

The present invention is directed at the problem of so developing a display screen device of the type indicated above that illumination of high luminous density is made possible while the heating of the display screen device by the lamp is kept as slight as possible, without reflections occurring, and without the size and/or the weight of the display screen device being increased.

This problem is solved in accordance with the invention in the manner that at least one lamp is arranged in an accessory unit, and that a means for transmitting light to the display field is present in the display screen device.

By the structural separation of the display screen device and the accessory unit which has the lamp, a definite reduction in the heating of the display field is obtained, since the heat-producing parts are located outside of the display screen device. In the case of a portable display screen device, its weight and its size are reduced since it does not contain any illuminating system, but illumination is nevertheless possible in combination with the accessory unit.

Since the illuminating device and the source of current supplying it are arranged stationary outside the display screen device, they can be of large size and permit a high consumption of current, which enables illumination of high luminous density.

The display screen device can be developed structurally in the manner that the accessory unit is fastened to an edge of the display field. Its illumination, however, is more comfortable if the display screen device is provided on its rear with at least one light input behind which the lamp of the accessory unit is arranged, and if the display field is transilluminatable. One particular advantage of this further development of the invention is that the indirect illumination of the display field avoids undesired reflections. Furthermore, particularly uniform illumination can be obtained with transmitted light.

In order to transmit the light from the lamp uniformly onto the display field, mirrors can be provided. These mirrors, however, increase the structural expense and result in a large size. The structural development is particularly simple if the means in the display screen device for the transmitting of light to the display field is a light guide. Such light guides can be produced at low cost and are easy to install. Their optical properties permit a particularly uniform illumination of the display field. Transmission of the heat given off by the lamp is prevented by the material of the light guide. Materials ordinarily used for light guides have a high transmittance for visible light and a comparatively low transmittance for heat radiation.

The light can be particularly easily conducted to required points in the accessory unit if a light guide is also present in the accessory unit.

One advantageous further development of the invention provides that light input surfaces corresponding to light output surfaces on the accessory unit are arranged on the back of the display screen device. In this way, optimum distribution of the light is obtained.

The transfer of the light from the accessory unit to the display screen device is particularly advantageous if the light output surface has a convex shape and the light input surface has a concave shape. These shapes are easy to clean and assure excellent conduction of light. Furthermore, the display screen device is automatically centered on the accessory unit, which results in increased ease of operation. Further centering or guiding for the display screen device is thus not necessary. Of course, vice versa, the light output surface may have a concave shape and the light input surface a convex shape.

For a portable display screen device, such as for instance a navigation instrument for a motor vehicle, it is advantageous if the accessory unit is a mounting device which receives the display screen device and is installed fixed in position in the vehicle. In this way, the accessory unit can remain in place in the vehicle while the display screen device is transportable and can be used with its own current supply (battery), although also without illumination of its own.

In this way, the weight of the portable display screen device is kept low and, despite relatively small batteries for the internal supply of current, a long operating life is assured, since the consumption of energy by illumination is completely avoided during the mobile operation.

The display screen device is more convenient to use if, in accordance with a further development of the invention, a switch which activates the lamp and is controlled from the display screen device is present in the accessory unit.

For the display screen device, it is advantageous if, in addition to the internal current supply of the display screen device, it have an external current supply which is independent thereof. Particularly when the accessory unit is developed as a stationary mounting device, this further development of the invention assures a more reliable supply of current for lamp and display screen device. Since the current supply present in the display screen device is not used for illuminating purposes, its capacity is spared and thus its life also increased.

It is of great advantage if a battery arranged in the display screen device can be used with the external supply of current. In this way, the battery can then be charged.

The display field can at all times be noted clearly if the lamp can be dimmed, particularly dimmed as a function of the surrounding light.

One particularly diversified field of use of the invention resides in the display screen device being developed to display information required in a motor vehicle.

Particularly in a motor vehicle, the accessory unit can also be used without the display screen device as illuminating unit, for instance for the reading of a map.

The lamp in the accessory unit can be used for the transmitting of a signal if the lamp can be controlled from the display screen device. In this way it is possible to have the lamp, for instance blink upon pre-programmed events in the display screen device under the control of the latter.

BRIEF DESCRIPTION OF THE DRAWING

With the above and other objects and other advantages in view, the present invention will become more clearly understood in connection with the detailed description of a preferred embodiment, when considered with the accompanying drawing of which the sole FIGURE shows a cross section through an illuminating device in accordance with the invention:

DETAILED DESCRIPTION OF THE PREFERRED EMBODIMENT

The drawing shows a display screen device 1 which is inserted into an accessory unit 2. Within the accessory unit 2 there are lamps 3 which are connected by light guides 4 to the display screen device 1. Within the display screen device 1 there are also light guides 4 which transport the light 5 to a display field 6, which may be developed suitably as an energy-saving liquid-crystal display. The transfer of the light 5 from the accessory unit 2 to the display screen device 1 is effected by light output surfaces 7 on the accessory unit 2 and light input surfaces 8 on the display screen device 1. The light output surface 7 is of convex shape adapted to the concave shape of the input surface 8. This shaping centers the display screen device 1 on the accessory unit 2. In this way, an optimal conduction of the light 5 is at all times assured.

External current supply for the display screen device 1 is effected via contact rails 9 after the insertion of the apparatus into the accessory unit 2. A battery (not shown) in the display screen device 1 which permits the operation of the screen upon portable use independently of the external source of current is charged at the same via the contact rails 9. This has the great advantage that the display screen device 1 is available for portable use at all times with the full capacity of its internal current supply.

On the side of the accessory unit 2 facing the display screen device 1, there can be noted a switch 10 which turns the lamp 3 on as soon as the display screen device 1 is pushed into the accessory unit 2.

On the display screen device 1, below the display field 6 there is a keypad 11 having keys 12.

The lamps 3 can be controlled separately and have different colors. In this way, for instance, depending on the operating mode of the display screen device 1 at the time, a different background color of the display field 6 can be obtained.

What is claimed is:

1. A display system including a screen device having a display field which can be illuminated by at least one lamp, the system comprising:
    a screen device having a display field, an accessory unit separate from the screen device, a lamp located in the accessory unit, and means for transmitting light of the lamp from the accessory unit to the display field;
    wherein said light transmitting means includes a first section of a light guide disposed within said accessary unit for receiving light from said lamp and for conducting light from said lamp toward said display field;
    a second section of a light guide extending perpendicularly to an interface between said accessory unit and said screen device, said second section of the light-guide having a bend within said screen device for extending parallel to said interface and transversely across said screen device for directing light within said screen device in a direction transverse of said display field for illuminating said display field; and
    means for optically coupling said first section of light guide to said second section of light guide;
    wherein the construction of said optical coupling means permits relative displacement between said first section of light guide and said second section of light guide, and between said screen device and said accessory unit to accomplish optical coupling upon a bringing of the accessory unit to the screen device.

2. A system according to claim 1, wherein said coupling means comprises a light input surface located in a region of said screen device facing said accessory unit, wherein, upon positioning said screen device relative to said accessory unit, said input surface receives light of said lamp for transmission of the light via said transmitting means for illumination of said display field.

3. A system according to claim 2, wherein said first section of light guide is an extension of said second section of light guide and is coupled thereto via said input surface upon said positioning of said screen device relative to said accessory unit.

4. A system according to claim 2, wherein said coupling means comprises a light output surface on said accessory unit which couples to said light input surface upon said positioning of said screen device relative to said accessory unit, said light input surface being located on a back of said screen device opposite said display field.

5. A system according to claim 1, wherein said accessory unit is a stationary mounting device for receiving said display screen device.

6. A system according to claim 1, further comprising a switch located in said accessory unit, said switch serving to activate said lamp upon contact of said display screen device with said switch upon a receiving of said display screen device by said accessory device.

7. A system according to claim 1, wherein said accessory unit has a current supply which is independent of said display screen device.

8. A system according to claim 1, further comprising a battery which is located in said display screen device and is connectable to an external supply.

9. A system according to claim 1, further comprising means for dimming said lamp as a function of ambient light.

10. A system according to claim 1, wherein said display screen device is capable of displaying information for a motor vehicle.

11. A system according to claim 1, further comprising means within said accessory unit for controlling said lamp in response to proximity of said screen device to said accessory unit.

12. A system according to claim 1, wherein
said screen device produces images, and said display field comprises an LCD.

13. A display system including a screen device having a display field which can be illuminated by at least one lamp, the system comprising:
a screen device having a display field, an accessory unit separate from the screen device, a lamp located in the accessory unit, and means for transmitting light of the lamp from the accessory unit to the display field;
wherein said light transmitting means includes a first section of a light guide disposed within said accessary unit for receiving light from said lamp and for conducting light from said lamp toward said display field;
a second section of a light guide extending within said screen device transversely across said screen device for directing light in a direction transverse of said display field for illuminating said display field; and
means for optically coupling said first section of light guide to said second section of light guide;
wherein the construction of said optical coupling means permits relative displacement between said first section of light guide and said second section of light guide, and between said screen device and said accessory unit to accomplish optical coupling upon a bringing of the accessory unit to the screen device;
said coupling means comprises a light output surface on said accessory unit which couples to said light input surface upon said positioning of said screen device relative to said accessory unit, said light input surface being located on a back of said screen device opposite said display field; and
said light output surface has a convex or concave shape and said light input surface has respectively a concave or convex shape.

14. A display system including a screen device having a display field illuminatable by at least one lamp, the system comprising:
a portable display screen device having its own current supply;
a mounting device independent of the display screen device having its own current supply, said mounting device being capable of receiving the display screen;
a lamp located in the mounting device; and
means including a light guide for transmitting light of the lamp from the mounting device to a display field of the display screen upon receipt of the display screen by the mounting device;
wherein the construction of said transmitting means permits relative displacement between a first section of said light guide in said mounting device and a second section of said light guide in said screen device, and between said screen device and said mounting device to accomplish optical coupling upon a bringing of the mounting device to the screen device; and
said second section of the light guide extends perpendicularly to an interface between said mounting device and said screen device, said second section of the light guide having a bend within said screen device to extend parallel to said interface and transversely across said screen device for directing light from within said screen device to illuminate said display field.

15. A display system according to claim 14, wherein said light transmitting means is located in said screen device and comprises a light input surface located in a region of said screen device facing said mounting device, wherein, upon positioning said screen device relative to said mounting device, said input surface receives light of said lamp for transmission of the light via said transmitting means for illumination of said display field.

16. A display system according to claim 15, further comprising an extension of said light guide located in said mounting device and coupled to said light guide in said screen via said input surface upon said positioning of said screen device relative to said mounting device.

17. A display system according to claim 15, further comprising a light output surface on said mounting device which couples to said light input surface upon said positioning of said screen device relative to said mounting device, said light input surface being located on a back of said screen device opposite said display field.

18. A display system according to claim 14, wherein said transmitting means is a light guide.

19. A display system according to claim 14, wherein said mounting device is a stationary mounting device for receiving said display screen device.

20. A display system according to claim 14, further comprising a switch located in said mounting device, said switch serving to activate said lamp under control of said display screen device.

21. A display system according to claim 14, wherein said mounting device has a current supply which is independent of said display screen device.

22. A display system according to claim 14, further comprising a battery which is located in said display screen device and is connectable to an external supply.

23. A display system according to claim 14, further comprising means for dimming said lamp as function of ambient light.

24. A display system according to claim 14, wherein said display screen device is capable of displaying information for a motor vehicle.

25. A display system according to claim 14, further comprising means within said mounting device for controlling said lamp in response to proximity of said screen device to said mounting device.

26. A display system including a screen device having a display field illuminatable by at least one lamp, the system comprising:
a portable display screen device having its own current supply;
a mounting device independent of the display screen device having its own current supply, said mounting device being capable of receiving the display screen;
a lamp located in the mounting device; and
means including a light guide for transmitting light of the lamp from the mounting device to a display field of the display screen upon receipt of the display screen by the mounting device;
wherein the construction of said transmitting means permits relative displacement between a first section of said light guide and a second section of said light guide, and between said screen device and said mounting device to accomplish optical coupling upon a bringing of the mounting device to the screen device;

said light transmitting means is located in said screen device and comprises a light input surface located in a region of said screen device facing said mounting device, wherein, upon positioning said screen device relative to said mounting device, said input surface receives light of said lamp for transmission of the light via said transmitting means for illumination of said display field;

said transmitting means further comprises a light output surface on said mounting device which couples to said light input surface upon said positioning of said screen device relative to said mounting device, said light input surface being located on a back of said screen device opposite said display field; and said light output surface has a convex or concave shape and said light input surface has respectively a concave or convex shape.

* * * * *